May 25, 1948.    J. L. FAGAN    2,442,236
LOCOMOTIVE CAB
Filed Feb. 19, 1945    2 Sheets-Sheet 1

James L. Fagan
INVENTOR.

BY Milo B. Stevens & Co.

Attorneys

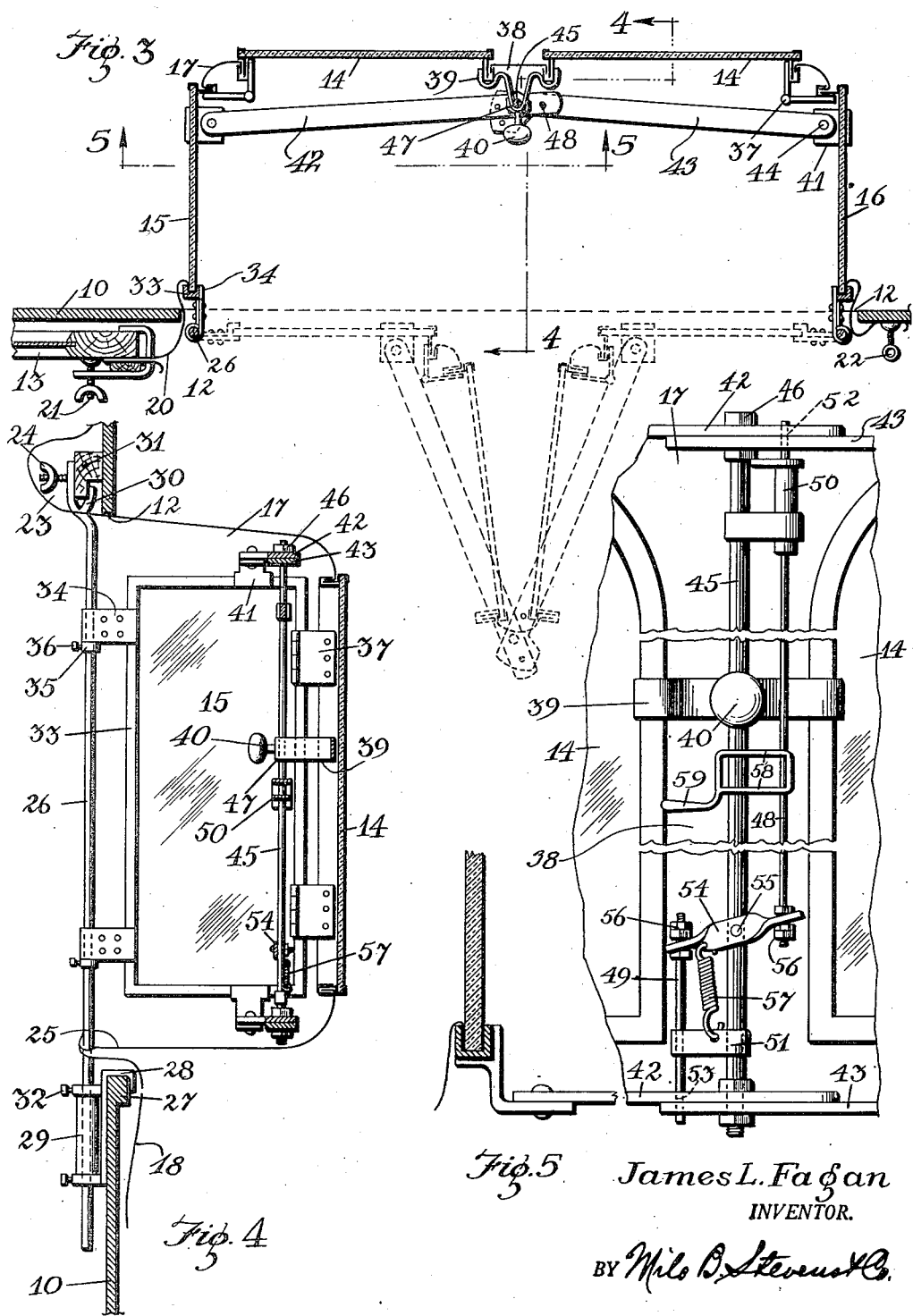

Patented May 25, 1948

2,442,236

UNITED STATES PATENT OFFICE 2,442,236

LOCOMOTIVE CAB

James L. Eagan, Chicago, Ill.

Application February 19, 1945, Serial No. 578,711

10 Claims. (Cl. 160—183)

My invention relates to locomotive cabs, and more particularly to means therein for procuring a view of the right of way in forward or rearward direction or of objects or conditions alongside the right of way. While locomotive cabs have windows for the above purposes, they often prove inadequate for securing a sufficient view, and the engineer is obliged to lean out of a side window to be satisfied that his view is clear or sufficiently certain for safety. This practice causes him more or less discomfort in bad weather and is particularly disagreeable when it rains or snows, adding a menace to health.

In view of the above conditions, it is one object of the present invention to provide an alcove leading from the side window of the locomotive cab as an enclosure affording a shelter coupled with a wider view to the front, rear and side of the right of way.

A further object is to provide an alcove of the above character which is quickly foldable to be flush with the side of the cab in the event that the same approaches a close clearance on the side carrying the alcove.

Another object is to design the novel alcove in a manner to be readily mountable in either side window of the engine cab and to be quickly removable at such time as its use is not desired.

An important object is to construct the alcove for easy cleaning access and in a manner to be foldable into a compact package or bundle when it is to be packed, stored or shipped.

With the above objects in view and any others which may suggest themselves from the description to follow, a better understanding of the invention may be had by reference to the accompanying drawings, in which—

Fig. 3 is an enlarged section on the line 3—3 of Fig. 2;

Fig. 4 is a section on the line 4—4 of Fig. 3, rotated 90 degrees clockwise; and Fig. 5 is a broken fractional view on an enlarged scale, taken on the line 5—5 of Fig. 3.

Figure 2:
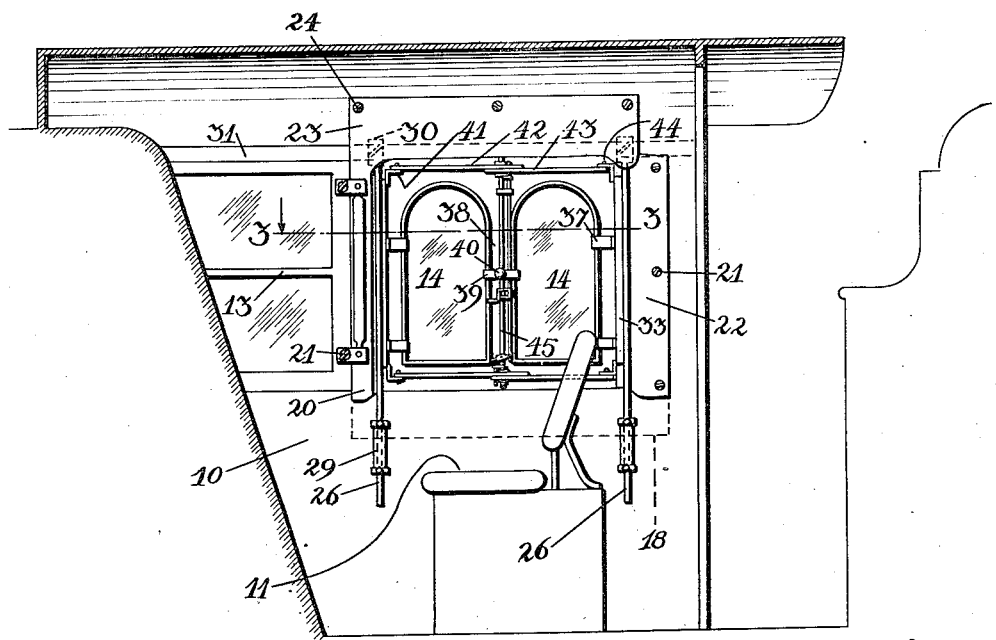
Fig. 2 is a side elevation of the cab interior, showing the position of the alcove.

In accordance with the foregoing, specific reference to the drawing indicates a side wall of the locomotive cab at 10, the engineer's seat at 11 and the regular side window opening at 12. Figs. 2 and 3 show that the window sash 13 has been slid forward clear of the opening 12 to a position inside the cab wall 10.

Figure 1:
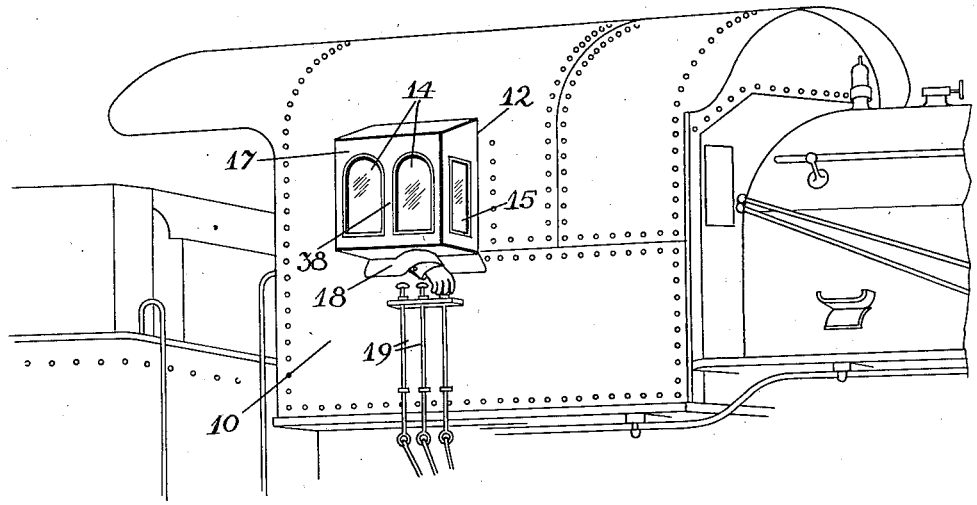
Fig. 1 is a perspective view of a locomotive cab from the outside and showing the alcove mounted.

The structure of the alcove is defined by a pair of side windows 14, a front window 15 and a rear window 16. These windows are bound together by a wrapper or casing 17 of oilcloth, rubberized duck or other durable and waterproof material, so that the covered alcove presents an external appearance in accordance with Fig. 1. The alcove thus constitutes a side extension of the cab in the region where the engineer leans out for a better view. However, the alcove affords full protection from the elements and provides complete comfort for its occupant. The casing 17 is preferably made with a bottom flap 18 which may be opened as shown in Fig. 1 when the engineer wishes to reach down to actuate the injector rods 19 located on the outside of the cab. Fig. 3 shows that the casing 17 is extended laterally at 20 into the window opening 12 to be clamped at 21 to the sash 13 on one side and at 22 on the opposite side to the cab wall 10. Likewise, Figs. 2 and 4 show that the casing is drawn into the window opening at the top as shown at 23 to be clamped to the cab wall as indicated at 24 in Fig. 2; and the bottom of the casing is tucked into the window opening at the bottom as shown at 25 and returned in the form of the pendent flap 18. The casing thus secures a complete closure of the window opening.

The alcove as a unit receives its support from a pair of vertical rods 26 located near the side limits of the window opening 12. Fig. 4 shows that the bottom 27 of the latter receives a hanger 28 in the region of each rod, such hanger having a tubular socket 29 on its inner side. While the upper end of each rod is forked at 30 to engage a horizontal rail 31 on the inner side of the cab wall 10, the lower portion of the rod is adjustable in the socket 29 according to the height of the bottom 27 and fixed by a pair of set screws 32.

The frames 33 of the front and rear windows 15 and 16 have brackets 34 slidable on the rods 26; and collars 35 adjustable along the rods by means of set screws 36 and make it possible to set the windows referred to at a height to best fit the flexible casing 17. The front and rear windows are connected to the adjacent side windows 14 by hinges 37, while the side windows are interconnected by a flexible spacer 38 forming a part of the casing 17.

The side windows 14 are connected on the inside by a flexible metal strap 39 having an inwardly-projecting knob 40. Thus, the latter may be pulled in to fold the side windows 14 back in the middle and draw inwardly upon the front and rear windows, so that the side windows project into the cab, while the front and rear windows fold flush with the cab wall 10, as indicated by finely dotted lines in Fig. 3.

A control for the position and movement of the alcove windows will now be described. The front and rear windows carry brackets 41 at the top and bottom to which are pivoted the outer ends of two sets of horizontal bars 42 and 43, as indicated at 44. The bars extend inwardly from the brackets 41, the bars 42 overlapping the bars 43 in the medial zone of the alcove. The exact center thereof is occupied by a vertical rod 45 whose upper and lower ends pass through the upper and lower overlapped bars to form a pivot therefor; and the bars are secured to the rods by upper and lower nuts 46 threaded thereon.

The strap 39 has a center fold 47 in which the rod 45 is welded or otherwise secured. Thus, the pull of the knob 40 to collapse the alcove also secures an infolding movement of the pairs of bars 42 and 43 as indicated by finely dotted lines in Fig. 3. However, the rods are designed to serve in the original or extended positions to keep the alcove in the projected form. Figs. 4 and 5 show a simple mechanism for this purpose. Thus, a long vertical bolt 48 is located at one side of the center rod 45, and a short one 49 occurs on the other side thereof. The bolts 48 and 49 are slidable in bearings 50 and 51 projected from the rod 45, the upper end of the bolt 48 passing through alined perforations 52 in the upper bars 42—43, and the lower end of the bolt 49 passing through alined perforations 53 in the lower bars. The bars are thus locked in the extended positions and cannot fold as previously described. A turn button 54 is pivoted at 55 near the lower end of the rod 45 and adjustably secured at 56 to the inner ends of the bolts 48 and 49. The turn button is drawn by a spring 57 toward the bearing 51 and in a direction to maintain the bolts advanced in the bar perforations 52 and 53. The bolt 48 carries a bracket 58, and passes vertically through the same. The bracket is made fast to the bolt by suitable means, and it is extended laterally with a handle 59. Thus, when the latter is pressed down the bolts 48 and 49 are retracted from the overlapped bars, permitting the knob 40 to be drawn and the alcove to be pulled in flush with the side of the cab.

It will now be evident that the novel alcove has a number of meritorious features. First, it provides a complete shelter with ample forward, rear and lateral vision in the viewing zone outside the cab, so that the engineer may lean into and occupy the alcove without the need of heavy clothing, exposure to the elements or any risk to his comfort or health. Further, the alcove combines a flexible casing with a foldable framework. Further, the alcove is kept rigid in the extended position by the locking device described above, but may be quickly collapsed by depressing the handle 59 and pulling the knob 40, so as to fold flush with the side of the cab, the collapsing controls being directly at one side of the engineer's seat and very handy. Further, the windows of the alcove are flat and capable of being equipped with wiping or defrosting devices of the types used in automobiles or motor coaches. Further, the clamps securing the alcove to the cab wall may be readily unscrewed to permit the folded alcove to be removed at such times as its use is not desired and stored away in a compact space.

While I have described the invention along specific lines, various minor changes or refinements may be made therein without departing from its principle, and I desire to consider such changes and refinements as coming within the scope and spirit of the appended claims.

I claim:

1. An external alcove extended from a side opening in a locomotive cab comprising a framework defining front, side and rear windows, and a casing around the windows and meeting the margin of said opening in weatherproof contact, said framework being foldable, and the casing being flexible to fold with the framework.

2. An external alcove extended from a side opening in a locomotive cab comprising a framework defining front, side and rear windows, and a casing around the windows and meeting the margin of said opening in weatherproof contact, said framework being foldable to a position flush with the side of the cab, and the casing being flexible to fold with the framework.

3. An external alcove extended from a side opening in a locomotive cab comprising a framework defining front, side and rear windows, and a casing around the windows and meeting the margin of said opening in weatherproof contact, said framework and windows being foldable to a position wherein the side windows are swung close to each other and extend into the cab, and the front and rear windows are swung inwardly to alined positions parallel with the side of the cab.

4. An external alcove extended from a side opening in a locomotive cab comprising a framework defining front, side and rear windows, and a casing around the windows and meeting the margin of said opening in weatherproof contact, and a flap in the bottom of the casing and adapted to be unfolded downwardly to create a bottom opening in the casing.

5. An external alcove extended from a side opening in a locomotive cab comprising a framework defining front, side and rear windows, and a casing around the windows and meeting the margin of said opening in weatherproof contact, and means to lock the alcove in the extended position.

6. An external alcove extended from a side opening in a locomotive cab including a pair of side windows flexibly joined along their contiguous edges, front and rear windows pivoted to the sides of the opening and the outer edges of said side windows, and a knob projecting inwardly from the flexible joining zone of the side windows and adapted to be pulled to procure the inward folding of the latter and said front and rear windows.

7. The structure of claim 6, bars pivoted to the front and rear windows and adapted to be folded in pairs together with the side windows, said bars having overlapping portions, a medial vertical rod as a pivot and alined perforations in said overlapping portions laterally of the pivot, and bolts entering the perforations to lock the bars from pivoting motion.

8. The structure of claim 6, bars pivoted to the front and rear windows and adapted to be folded in pairs together with the side windows, said bars having overlapping portions, a medial vertical rod as a pivot and alined perforations in said overlapping portions laterally of the pivot, bolts entering the perforations to lock the bars from pivoting motion, and a joint control to retract the bolts from the perforations and release the bars for pivoting movements.

9. The structure of claim 6, bars pivoted to the front and rear windows and adapted to be folded in pairs together with the side windows, said bars having overlapping portions, a medial vertical rod as a pivot and alined perforations in said overlapping portions laterally of the pivot, bolts entering the perforations to lock the bars from pivoting motion, and a joint control to retract the bolts from the perforations and release the bars for pivoting movements, said control being a link medially pivoted on said rod and having its end portions pivoted to the bolts.

10. An external alcove extended from a side opening in a locomotive cab comprising a pair of hangers mounted on the bottom of the opening, extended inside of the cab and provided with sockets, a rail in the cab above the opening, a pair of vertical rods having their lower portions adjustably mounted in the sockets and their upper ends clamped to the rail, a series of alcove windows swingingly mounted on and extending outwardly from the rods, and a flexible casing surrounding the windows and meeting the margin of said opening in weatherproof contact.

JAMES L. FAGAN.

REFERENCES CITED

The following references are of record in the file of this patent:

UNITED STATES PATENTS

| Number | Name | Date |
|---|---|---|
| 586,896 | Carroll | July 20, 1897 |
| 2,311,550 | Kaufman | Feb. 16, 1943 |
| 2,333,574 | Kaufman | Nov. 2, 1943 |